April 1, 1952  J. R. SNYDER  2,591,102
SELECTOR VALVE

Filed June 25, 1945  2 SHEETS—SHEET 1

Inventor
JACOB RUSH SNYDER

Inventor
JACOB RUSH SNYDER

Patented Apr. 1, 1952

2,591,102

UNITED STATES PATENT OFFICE 2,591,102

SELECTOR VALVE

Jacob Rush Snyder, Cleveland, Ohio, assignor to Thompson Products, Inc., Cleveland, Ohio, a corporation of Ohio Application June 25, 1945, Serial No. 601,377

4 Claims. (Cl. 251—113)

This invention relates to plug valves equipped with the least number of port passages and seals to obtain the most number of flow control positions.

Specifically this invention relates to selector valves for engine fuel systems, such as aircraft fuel systems, wherein five flow control positions are obtained with only three fluid flow ports.

A feature of this invention resides in the provision of a valve casing or housing with a first inlet port having a large recess in unsealed confronting relationship with a passaged valve plug and so arranged relative to the valve passages, a second inlet port, and an outlet port, that five different fluid flow control positions are available by rotating the plug.

A specific use for the valve of this invention is to selectively connect the carbureter of an engine with a pair of fuel tanks to obtain the following fluid flow control conditions:

(1) Cross flow between tanks with no flow to carbureter.

(2) Flow from one tank only to the carbureter.

(3) Flow from the other tank only to the carbureter.

(4) Simultaneous flow from both tanks to the carbureter.

(5) Sealing flow from both tanks and from the carbureter.

The selector valves of this invention have a simple, inexpensive and efficient arrangement of the minimum number of plug valve and housing parts to obtain the maximum number of flow control conditions without impeding flow through the valve in any of the open flow positions. The plug valve is a cylindrical member rotatably mounted in the cylindrical operating chamber of the housing and having three merging passages therein opening in closely spaced relation on the periphery of the plug. The ports of the housing are so positioned to register with the openings of these merging passages for producing the desired flow connection and stop flow positions. One of the ports is unsealed and has a relatively large recess confronting the periphery of the plug and adapted to register simultaneously with two of the passage openings in some positions of the plug. A second inlet port is provided on one side of the recess at an obtuse angle to the first inlet port. A blind port is provided at the other side of the recess in obtuse angular relation to the first inlet port. The outlet port is positioned between the second inlet port and the blind port in substantial alignment with the first inlet port. Only the second inlet port, the blind port, and the outlet port are equipped with seals, and these seals are effective to stop leakage from the recess around the plug into the respective ports as well as to stop leakage out of the seal-equipped port around the periphery of the plug. The obtuse angular relationship of the second inlet port and blind port with the first inlet port makes possible the use of a small plug with three large passages, two of which can be simultaneously placed in full communication with the recess.

The blind port carries a seal and thereby eliminates the necessity for sealing the large recess of the first inlet port. This blind port can be converted into a live port by replacing the closure cap thereon with a nipple. Likewise, any of the live seal-carrying ports can be converted into a blind port by placing a closure cap thereon.

It is, then, an object of this invention to provide a selector valve which has a maximum number of fluid flow control positions with a minimum number of ports and port seals.

A further object of this invention is to provide a plug type valve wherein maximum flow capacity can be obtained from minimum sized parts.

A still further object of this invention is to provide a fluid flow control valve which has five fluid flow control positions and only three live ports.

A still further object of this invention is to provide a selector valve adapted for aircraft fuel systems and the like which has two inlet ports and an outlet port controlled by a single plug valve to produce five different kinds of fluid flow connections.

A still further object of this invention is to provide a dead port in a selector valve with a seal to obviate the necessity for sealing one of the live ports.

Other and further objects of this invention will be apparent to those skilled in the art from the following detailed description of the annexed sheets of drawings which, by way of a preferred example only, illustrate one embodiment of the invention.

Figure 1:
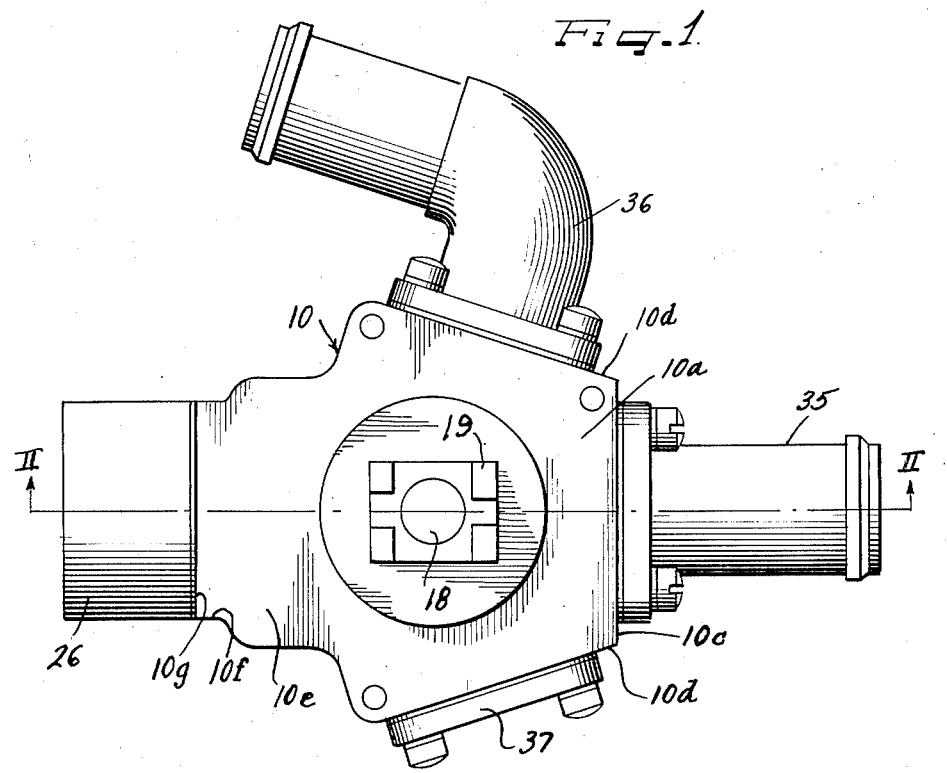
Figure 1 is a plan view of a selector valve according to this invention.
Figure 2:
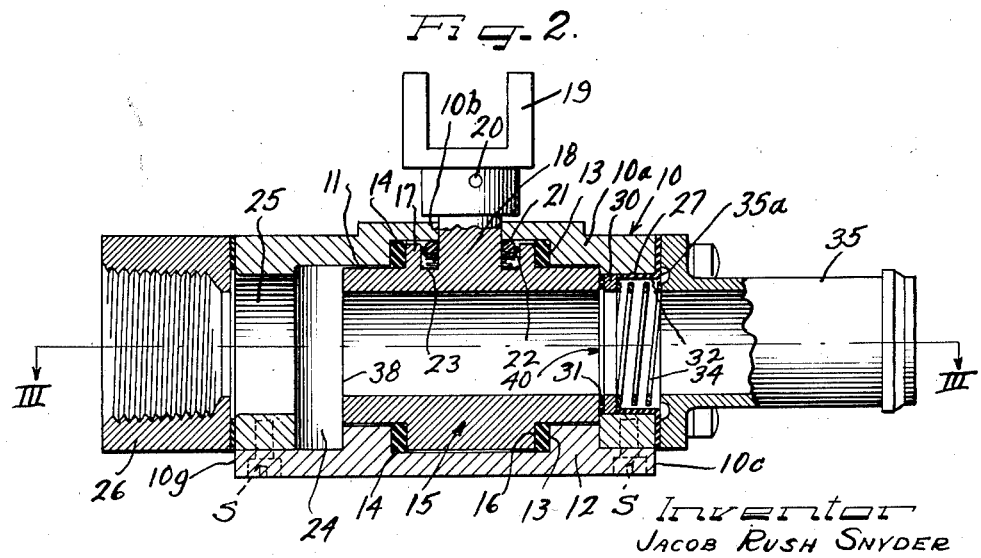
Figure 2 is a vertical cross-sectional view, with parts in side elevation, taken substantially along the line II—II of Figure 1.
Figure 3:
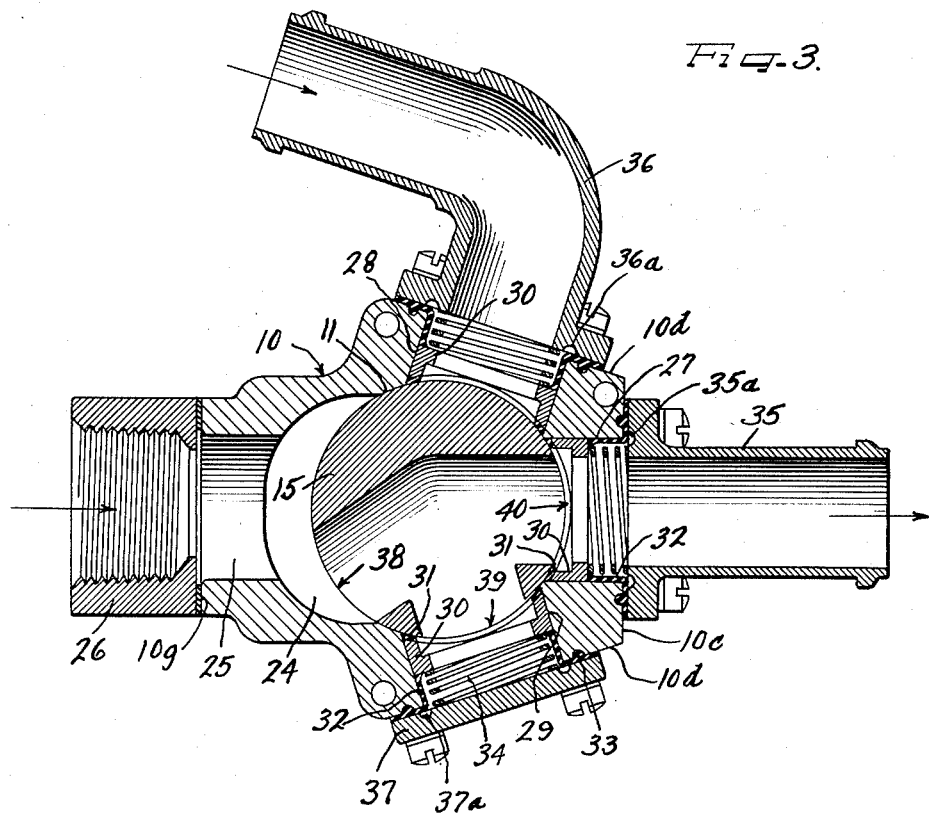
Figure 3 is a horizontal cross-sectional view taken substantially along the line III—III of Figure 2.

In Figures 1 to 3 the reference numeral 10 designates a casing or housing for the selector valve of this invention. This casing has an integral top wall 10a with a central aperture 10b therethrough. The casing 10 defines an open-bottomed cylindrical operating chamber 11 closed by a cover 12 which is attached to the casing as by means of screws S.

Opposed cylindrical recesses 13, 13 are formed in the inner faces of the top wall 10a of the casing and in the cover 12. Each of these recesses receives a bearing sleeve 14.

A cylindrical plug 15 has a reduced-diameter cylindrical lug portion 16 extending into the bearing sleeve 14 seated in the recess 13 of the cover 12. A collar 17 projects from the upper end of the plug 15 into the other bearing 14 seated in the recess 13 of the top casing wall 10a. A shank 18 extends through the collar 17 and through the aperture 10b of the top wall 10a. A driving yoke 19 is secured to the portion of the shank 18 beyond the casing 10 as by means of a pin 20. A spring-pressed seal assembly composed of a rubber ring 21, a metal retainer 22, and a spring 23 surrounds the shank 18 within the collar 17 and stops leakage through the aperture 10b of the casing wall 10a by pressing the rubber ring 21 into sealing engagement with the shank 18 and the top wall 10a.

The plug 15 is thus rotatably mounted within the operating chamber 11 of the casing.

As best shown in Figures 1 and 3, the casing 10 has a flat outer wall or face 10c, with flat side walls or faces 10d, 10d diverging from the end face in obtuse angular relation therewith. The side walls 10d, 10d diverge to an extended portion 10e on the end of the casing opposite the end 10c. This extended portion 10e terminates in a reduced cylindrical neck 10f having a flat end face 10g parallel with the end wall or end face 10c.

The extended portion 10e defines a recess 24 in the casing 10 as best shown in Figures 2 and 3. This recess 24 is in full open communication with the operating chamber 11 of the casing and has a large end of slightly smaller diameter than the operating chamber so that the periphery of the plug valve will have a substantial portion thereof exposed to the recess, but this exposed portion will be less than half of the circumference of the plug valve.

A cylindrical port 25 is formed through the neck 10f of the casing to communicate with the central portion of the recess 24. A nipple 26 for threaded attachment to a pipe line from a tank or the like is carried by the casing in sealed relation to the end face 10g thereof. For purposes of illustration, this nipple 26 will be described as receiving the pipe line from the first fuel tank of an airplane, and the port 25 will be referred to as the first inlet port of the selector valve.

As best shown in Figure 3, a bore 27 normal to the end wall or face 10c of the casing 10 is formed through the casing to the operating chamber 11. A similar bore 28 is formed through one of the side walls 10d, and another similar bore 29 is formed through the other of the side walls 10d. These bores 27, 28 and 29 provide ports for the valve and, as shown, these ports, being normal to the end walls 10c and 10d, will communicate with that portion of the circumference of the plug valve 15 that is not exposed to the recess 24 and, at the same time, make possible the provision of a large recess. The port 27 is opposite and in alignment with the port 25, but in acute angular relationship with the ports 28 and 29. This relationship makes it possible to extend the size of the recess 24 without merging the recess into the ports 28 and 29 and without necessitating the use of a larger casing.

Each port 27, 28 and 29 slidably supports a rigid seal ring 30 with a cylindrically dished end face carrying a seal 31 composed of rubber or other resiliently deformable material. The seal 31 sealingly engages the periphery of the plug 15. Each seal ring 30 is also bonded to a combination sleeve and gasket 32 which forms a liner for the port and extends over the end face of the casing at the outer end of the port to provide a gasket.

Lugs 33 are preferably formed on the gasket portion of the member 32 to be seated in holes in the end face of the casing spaced from the port to facilitate seating the seal assembly in proper alignment with the plug. A spring 34 acts on the seal ring 30 to urge the seal 31 into sealing engagement with the plug 15.

A nipple 35 is secured on the end wall 10c of the casing 10. This nipple 35, for purpose of illustration, will be described as being connected to the carburetor of an engine, and the port 27 will be described as the outlet port for the valve. The nipple 35 has a groove 35a around the end face thereof providing a recess into which the sleeve member 32 can extend to accommodate sliding movements and swelling of the seal assembly.

A nipple 36 is secured on one face 10d of the casing 10 and has a similar groove 36a in the end face thereof. This nipple 36, for purpose of illustration, will be described as connected to the pipe line from the No. 2 tank, and the port 28 communicating with the nipple will be described as the second or No. 2 inlet port of the valve.

A closure cap 37 is secured to the other side wall or face 10d of the casing 10, and this cap has a groove 37a in its end face to accommodate the sleeve 32. For purposes of illustration the port 29 closed by the closure cap 37 will be described as a blind port.

As shown, the springs 34 for the seal assemblies are bottomed on the nipples and closure cap.

To accommodate right and left hand mounting, the closure cap 37 and the nipple 36 are interchangeable so that the port 28 can become a blind port and the port 29 can become the second inlet port.

As best shown in Figure 3, the plug 15 has three merging passages 38, 39 and 40 therein. These passages all converge or merge in the body of the plug and have openings in the periphery or circumference of the plug in closely spaced relation so that these openings will lie within a portion of the periphery or circumference that can, in one position of the plug, be entirely out of registration with the recess 24 while, in other positions of the plug, two of the passages can be in full communication with the recess. The passages are arranged in angular relationship to each other corresponding with the angular relationship of the ports 27, 28 and 29 to be in full registration with these ports.

Figure 4:
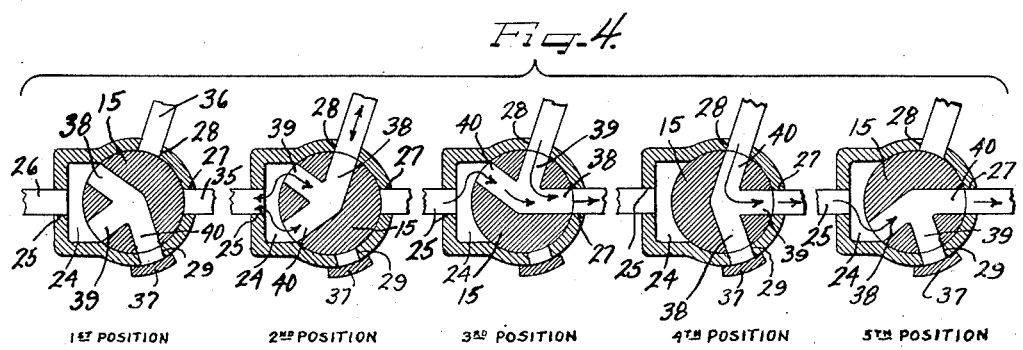
Figure 4 is a diagrammatic horizontal cross-sectional view of the valve of this invention illustrating the five fluid flow control positions of the valve.

As shown in Figure 4, the plug 15 has five different fluid flow control positions. In the first position, the passages 38 and 39 are in full registration with the recess 24 while the passage 40 registers with the blind port 29. In this position, no fluid can flow into or out of the valve. This position is known as the "All Off" position.

In the second position of Figure 4, the plug 15 has been rotated so that the passage 38 is in full registration with the second inlet port 28 while the passages 39 and 40 are in full communication with the recess 24 and the first inlet port 25. In this second position, fluid can flow from tank No. 1 connected to port 25, into tank No. 2 connected to port 28 or vice versa. This position is desirable to transfer fuel between tanks of an aircraft for balancing the load. When such transfer of fluid between tanks is occurring, the fluid is sealed off from the outlet port 27.

In the third position of the valve, the plug 15 has been further rotated to align the passage 38 with the outlet port 27, to align the passage 39 with the second inlet port 28, and to align the passage 40 with the recess 24 and first inlet port 25. In this position, fluid can flow from both tanks to the outlet port.

In the fourth position of the valve shown in Figure 4, the plug has been further rotated from the third position to align the passage 38 with the blind port 29, to align the passage 39 with the outlet 27, and to align the passage 40 with the second inlet port 28. In this position, the port 25 is closed and fluid will only flow from the second inlet port 28 to the outlet port 27.

In the fifth position of the valve the plug has been further rotated in a clockwise direction from the fourth position to align the passage 38 with the recess 24, to align the passage 39 with the blind port 29, and to align the passage 40 with the outlet port 27. In this position the second inlet port 28 is closed by the plug. As shown in the fifth position, fluid can flow from the first inlet port 25 to the outlet port 27 and no fluid can flow from the inlet port 28.

It will be noted that the recess 24 is not equipped with a seal engaging the periphery of the plug 15, as are the ports 27, 28 and 29. Such a seal is unnecessary since the seals in the ports 27, 28 and 29 are effective to stop leakage from the recess 24 into the ports as well as to stop leakage out of the ports into the recess. The arrangement is such that two live ports and one dead port are equipped with seals to eliminate the necessity for sealing the more difficultly sealable recess.

From the above description it will therefore be understood that this invention provides a fluid flow control device of a minimum size having maximum fluid flow capacity and a maximum number of fluid flow control positions.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A selector valve comprising a housing and a plug rotatable therein, said plug having three merging passageways therein extending to first, second and third openings on the periphery of said plug, said first and second openings and said second and third openings being spaced a predetermined arcuate distance less than ninety degrees, an outlet port in said housing, a first inlet port in said housing disposed opposite said outlet port and having an extended recess in confronting relation with the periphery of said plug, each end of said extended recess being spaced from said outlet port an arcuate distance substantially equal to twice said predetermined distance, and a second inlet port spaced from said outlet port an arcuate distance substantially equal to said predetermined arcuate distance, whereby said plug may be positioned for no fluid flow between said ports, for fluid flow only between said first inlet port and said second inlet port, for fluid flow between said first inlet port, said second inlet port and said outlet port, for fluid flow between only said second inlet port and said outlet port, and for fluid flow between only said first inlet port and said outlet port.

2. A selector valve comprising a housing and a plug rotatable therein, said plug having three merging passageways therein extending to first, second and third openings on the periphery of said plug, said first and second openings and said second and third openings being spaced a predetermined arcuate distance less than ninety degrees, a first port in said housing, a second port in said housing disposed opposite said first port and having an extended recess in confronting relation with the periphery of said plug, each end of said extended recess being spaced from said first port an arcuate distance substantially equal to twice said predetermined distance, a third port on one side of said housing and spaced from said first port an arcuate distance substantially equal to said predetermined distance, and a fourth port on the other side of said housing and spaced from said first port an arcuate distance substantially equal to said predetermined distance.

3. A selector valve comprising a housing and a plug rotatable therein, said plug having three merging passageways therein extending to first, second and third openings on the periphery of said plug, said first and second openings and said second and third openings being spaced a predetermined arcuate distance less than ninety degrees, a first port in said housing, a second port in said housing disposed opposite said first port and having an extended recess in unsealed confronting relation with the periphery of said plug, each end of said extended recess being spaced from said first port an arcuate distance substantially equal to twice said predetermined distance, a third port in one side of said housing and spaced from said first port an arcuate distance substantially equal to said predetermined distance, a fourth port in the other side of said housing and spaced from said first port an arcuate distance substantially equal to said predetermined distance, and seals in said first, third and fourth ports in sealing engagement with the periphery of the plug.

4. A selector valve comprising a housing and a plug rotatable therein, said plug having three merging passageways therein extending to first, second and third openings on the periphery of said plug, said first and second openings and said second and third openings being spaced a predetermined arcuate distance less than ninety degrees, an outlet port in said housing, a first inlet port in said housing disposed opposite said outlet port and having an extended recess in unsealed confronting relation with the periphery of said plug, each end of said extended recess being spaced from said outlet port an arcuate distance substantially equal to twice said predetermined distance, a second inlet port in one side of said housing spaced an arcuate distance from said outlet port substantially equal to said predetermined distance, a blind port in the other side of said housing spaced an arcuate distance from said outlet port substantially equal to said predetermined distance, a removable cap on said blind port, and seals in said outlet port, said second inlet port and said blind port in sealing engagement with the periphery of the plug.

JACOB RUSH SNYDER.

REFERENCES CITED

The following references are of record in the file of this patent:

UNITED STATES PATENTS

| Number | Name | Date |
|--------|------|------|
| 944,598 | Caskey | Dec. 28, 1909 |
| 1,381,873 | Hardy | June 14, 1921 |
| 2,165,096 | Frechette | July 4, 1939 |
| 2,226,169 | Koehler | Dec. 24, 1940 |
| 2,335,085 | Roberts | Nov. 23, 1943 |
| 2,369,887 | Eckman | Feb. 20, 1945 |
| 2,417,400 | Snyder | Mar. 11, 1947 |